US012143767B1

(12) United States Patent
Campbell

(10) Patent No.: US 12,143,767 B1
(45) Date of Patent: Nov. 12, 2024

(54) EARPHONE BIDIRECTIONAL PRESSURE PORT

(71) Applicant: Magnatone Hearing Aid Corporation, Casselberry, FL (US)

(72) Inventor: Don Campbell, Casselberry, FL (US)

(73) Assignee: Magnatone Hearing Aid Corporation, Casselberry, FL (US)

( * ) Notice: Subject to any disclaimer, the term of this patent is extended or adjusted under 35 U.S.C. 154(b) by 0 days.

(21) Appl. No.: 18/420,261

(22) Filed: Jan. 23, 2024

(51) Int. Cl.
*H04R 1/28* (2006.01)
*H04R 1/10* (2006.01)

(52) U.S. Cl.
CPC ......... *H04R 1/2826* (2013.01); *H04R 1/1016* (2013.01); *H04R 1/1075* (2013.01); *H04R 2460/11* (2013.01)

(58) Field of Classification Search
CPC .. H04R 1/2826; H04R 1/1016; H04R 1/1075; H04R 2460/11; H04R 25/50; H04R 25/405; H04R 25/453; H04R 25/456; H04R 25/305; H04R 2225/025; H04R 2225/61; H04R 2225/021; H04R 1/2888; H04R 9/06; H04R 1/2857; H04R 19/00; H04R 25/604; H04R 25/652; H04R 25/656; H04R 25/654; H04R 2225/0216; H04R 2225/57
USPC ........... 381/380, 328, 80, 313; 181/175, 128
See application file for complete search history.

(56) References Cited

U.S. PATENT DOCUMENTS 7,240,765 B2 7/2007 Berg et al.
7,864,972 B2 1/2011 McIntosh et al.
8,340,310 B2 12/2012 Ambrose et al.
8,800,712 B2 8/2014 Campbell et al.
8,885,866 B2 * 11/2014 Sakaguchi ........... H04R 1/1058 381/382
10,441,470 B2 10/2019 Ogut et al.
11,540,041 B2 * 12/2022 Kuipers ................. H04R 25/65
11,622,206 B2 * 4/2023 Zurbruegg ........... H04R 25/456 381/317
11,792,564 B2 * 10/2023 Kuipers ............... H04R 1/1016 381/328
2007/0121974 A1 * 5/2007 Nemirovski ......... H04R 1/1016 381/312
2009/0067661 A1 3/2009 Keady et al.
2013/0251161 A1 9/2013 Lott
2015/0023541 A1 * 1/2015 Ho ....................... H04R 1/1016 381/380
2015/0264471 A1 9/2015 Lott
2017/0245044 A1 * 8/2017 Cartwright ........... H04R 1/2811
2019/0020946 A1 * 1/2019 Tu .......................... H04R 1/345
2019/0104354 A1 * 4/2019 Valenzuela .......... H04R 1/1058

* cited by examiner

*Primary Examiner* — Carolyn R Edwards
*Assistant Examiner* — Julie X Dang
(74) *Attorney, Agent, or Firm* — Ice Miller LLP

(57) ABSTRACT

An audio device comprises an acoustic transducer or speaker with a bidirectional vent coordinating between the front and back of the speaker. The bidirectional vent provides a balanced impedance in both the push/pull conditions of the speaker excursions while minimizing listener fatigue, without the need for a separate external vent or separate pressure management material. The audio device may include dual sound ports which have different dimensions, that may be selected to tune the response curve of the audio device, and to create smooth transitions of pneumatic pressure between the ear canal and the speaker.

12 Claims, 4 Drawing Sheets

6

EARPHONE BIDIRECTIONAL PRESSURE PORT

BACKGROUND OF THE INVENTION

The present invention relates to audio devices and, in particular, to earphones and other in-ear audio devices that have a bidirectional pressure reducing port or sound port.

Conventional audio devices (e.g., earphones) commonly have an audio transducer or speaker, such as a dynamic driver or balanced armature driver that vibrates a diaphragm (e.g., speaker cone) to create sound pressure waves. The vibrating diaphragm pushes and pulls the surrounding air, which creates a pressure wave from both the front and back of the diaphragm. As the diaphragm moves toward the user, it pushes air toward the ear drum and creates positive pressure. Simultaneously, the diaphragm pulls the air behind it and creates negative pressure.

Earphone in-ear audio devices (e.g., ear bud headphones, hearing aids) typically occlude the ear by virtue of a casing and/or some method of sealing the ear, either through a customized fitting, one-size-fits-all tips made of silicone or foam, or other type of expanding or shaping device such as a balloon. A non-occluded ear has a natural open state, and a resulting frequency shape that is considered normal to the subject. Sealing the ear canal with an earphone or other in-ear device converts the ear canal to a closed system, which causes different perceptions to hearing in terms of amplitude across frequency. These effects reduce the ear's ability to differentiate sounds compared to a natural, non-occluded state (quarter wave resonator).

Sealing the ear canal also creates a closed sound-vibration chamber and can increase excursions of the tympanic membrane, which may induce the acoustic reflex (stapedius reflex). The acoustic reflex is a potentially damaging condition that involves the contraction of the middle ear muscles (stapedius and tensor tympani muscles) to tighten the tympanic membrane in response to very loud signals or even small excursions of the tympanic membrane. Tightening of the tympanic membrane has a dampening effect, wherein the ear attempts to protect itself from unnatural excursions. This dampening results in an unnatural sound quality across frequency and form variations in amplitude that can create different degrees of occlusion and attenuation, and for different time periods. It is known that few people can detect the acoustic reflex while occurring, but the tightening of the system can create reductions in volume, particularly lower audible frequencies beneath 1000 Hz, of 15-20 decibels. The user will often increase the volume of the audio signal to overcome the loss caused by the acoustic reflex. Prolonged periods of closed earphone use are known to create audio (ear) fatigue, which may lead to hearing damage (e.g., long term hearing loss) from the user attempting to compensate by adjusting the low frequency input or increasing volume to restore sound normalcy.

Speakers also produce mechanical (pneumatic) air pressure as well as sound pressure in the ear canal. Both sound pressure level (SPL) and pneumatic air pressure (PP) contribute to the hearing experience. Earphones (e.g., hearing aids) are commonly inserted into and seal the ear canal. The sealed design reduces the ambient or environmental sounds that compete inside the ear canal with the desired audio signal, but may also contribute to impedance mismatch and audio degradation of the speaker.

The insertion of an earphone into the user's ear forms an external cavity between the speaker and eardrum, that has a fixed space or volume within the sealed ear canal. When the speaker pushes air toward the ear drum, the air in the cavity has no place to go and is compressed. This sealed design causes the speaker to move the air mass inside a closed system which causes over-excursions on the tympanic membrane. The sealed design also creates an impedance mismatch to the speaker, wherein each push/pull of the speaker causes first a compression of the air-mass between the earphone and the tympanic membrane (push) and a decompression of the air-mass from the reverse direction (pull). This creates audio degradation of the speaker sound, including distortion as the speaker attempts to drive the sealed system.

Conventional methods to relieve the PP on the speaker include the use of elastic membranes to modify the earphone impedance, such as described in U.S. Pat. No. 8,340,310 to Ambrose et al. However, the elasticity of the material may change over time, which may reduce its ability to manage pneumatic pressure and may cause latency problems.

Other measures to reduce the PP on the speaker include designing the earphone with a pressure port or tiny hole open to the outside world or environment, that is essentially an external vent to an infinite space. While the pressure relief port provides additional freedom for the speaker to move in/out, it changes the resonance of the speaker chamber and affects the sound quality and the ear canal resonance. The difference in volume on both sides of the speaker creates an impedance mismatch—i.e. comparing the internal volume between the speaker and the tympanic membrane to the infinite volume of the outside world.

Alternatively, the earphone may have a pressure equalization external vent that bypasses the speaker cavity (also called a parallel vent) and is designed to help keep the pressure between the earphone and tympanic membrane from climbing significantly compared to the pressure behind the tympanic membrane (essentially the same as ambient air pressure). However, these external vents may create a feedback path making use uncomfortable at times, such as with hearing aids. Furthermore, external vents often become inadvertently plugged with dirt or ear wax, which degrades their functionality. These external ports are commonly provided with special covers that increase the size and cost of the earphones.

The external vents in earphones often include additional pressure management materials, which attempt to limit the amount of ambiance while helping to establish pressure equalization with the middle ear over time, such as described in U.S. Pat. No. 10,441,470 to Ogut et al. However, these pressure management materials are typically bulky, increase manufacturing costs and labor, and will inadvertently effect the sound quality and seal the ear canal. Attempts to tune the venting channel can also take time, and will vary with differences in ear canal volume, requiring a unique/custom approach for each user. The pressure management materials also can become blocked with debris or moisture over time, and can be accidentally destroyed by cleaning agents or other products used to clean the debris from the vent channel. These materials also stiffen and deteriorate over time due to exposure to the elements and body oils/sweat, making the acoustic signature change negatively.

Various methods are used to tune the frequency response of earphones to provide increased dynamic range and wide-frequency response, such as filters that are inserted in the sound pathway, and the use of multiple speakers with different response curves combined with a resistive and/or capacitive network called a cross-over. However, these methods may also introduce their own distortions. For example, cross-over networks may increase the peaks and valleys of the frequency response, adding phasing and distortions which can be audible and undesirable. In addition, the use of such components can increase manufacturing costs and labor, and may be constrained by the limited space available within the earphone or other device. For example, in-ear devices may be configured with multiple drivers, in an attempt to overcome the acoustic reflex and resulting dampening of the low frequency energy. These multiple speaker devices are commonly designed with multiple sound channels that must be combined (e.g., by a manifold) to make a path for the sound. Some in-ear devices are relatively small (e.g., hearing aids), with limited space available to add speakers and their required features and components (e.g., batteries, circuitry, and volume controls). It is also generally desirable to use larger dynamic speakers, which imposes a further constraint on the available space, even in single speaker devices.

Consequently, there is a need for an audio device with reduced PP in the ear canal and resulting ear fatigue, that does not require an external vent or parallel vent and/or additional pressure management materials. There is also a need for an audio device that, when producing either SPL or PP or both, does not cause excursions of the tympanic membrane beyond that of a normal open listening condition (quarter wave resonator). It would also be desirable to provide an audio device that reduces impedance mismatch caused by the push/pull of the speaker in a sealed system, and the resulting sound degradation. In addition, it would be desirable to modify the frequency response of an audio device, without the need for additional parts or without effecting the phase or adding distortions in the frequency response such as with cross-over networks.

SUMMARY OF THE INVENTION

An embodiment of an in-ear audio device comprises first and second device ends, a speaker, an internal cavity, a bidirectional pressure channel, and a primary sound channel. The first device end is sized and shaped to be received in the ear canal of a user. The second device end is exposed to the environment external to the ear canal when the first portion is positioned in the ear canal. The speaker has front and back sides that produce sound pressure, wherein the front and back sides are not in direct fluid communication. The internal cavity is in fluid communication with the speaker front side. The bidirectional pressure channel has first and second pressure channel ends, the first pressure channel end having an opening to the speaker back side, and the second pressure channel end having an opening to the internal cavity. The primary sound channel has first and second primary sound channel ends. The first primary sound channel end has an opening to the internal cavity, and the second primary sound channel end has an opening at the first device end. The speaker front and back sides are in indirect fluid communication through the pressure channel and the internal cavity, and sound pressure from the speaker front and back sides is combined in the internal cavity and delivered to the user's ear canal through the primary sound channel.

In one embodiment, an in-ear audio device comprises first and second device ends, a speaker, a primary sound channel, and a secondary sound channel. The first device end is sized and shaped to be received in the ear canal of a user. The speaker produces sound pressure. The primary sound channel comprises a tube with a first inner diameter, and has first and second primary sound channel ends. The first primary channel end is in fluid communication with the speaker, and the second primary sound channel end has an opening at the first device end. The secondary sound channel comprises a tube with a second inner diameter different from the first inner diameter, and has first and second secondary sound channel ends. The first secondary sound channel end is in fluid communication with the speaker, and the second secondary sound channel end has an opening at the device first end. The sound pressure from the speaker is delivered to the user's ear canal through the primary and secondary sound channels.

In one embodiment, an in-ear audio device comprises first and second device ends, a speaker, an internal cavity, a sound channel, and an ambient channel. The first device end is sized and shaped to be received in the ear canal of a user. The second device end is exposed to the environment external to the ear canal when the first device end is positioned in the ear canal. The speaker has front and back sides that produce sound pressure, wherein the front and back sides are not in direct fluid communication. The internal cavity is in fluid communication with the speaker front side. The sound channel has first and second channel ends. The first sound channel end has an opening to the internal cavity, and the second sound channel end has an opening at the first device end. The ambient channel has first and second ambient channel ends. The first ambient channel end has an opening to the internal cavity, and the second ambient channel end has an opening at the second device end. The ear canal is only in fluid communication with the environment external to the ear canal through the ambient channel and internal cavity.

DETAILED DESCRIPTION OF THE INVENTION

Figure 1:
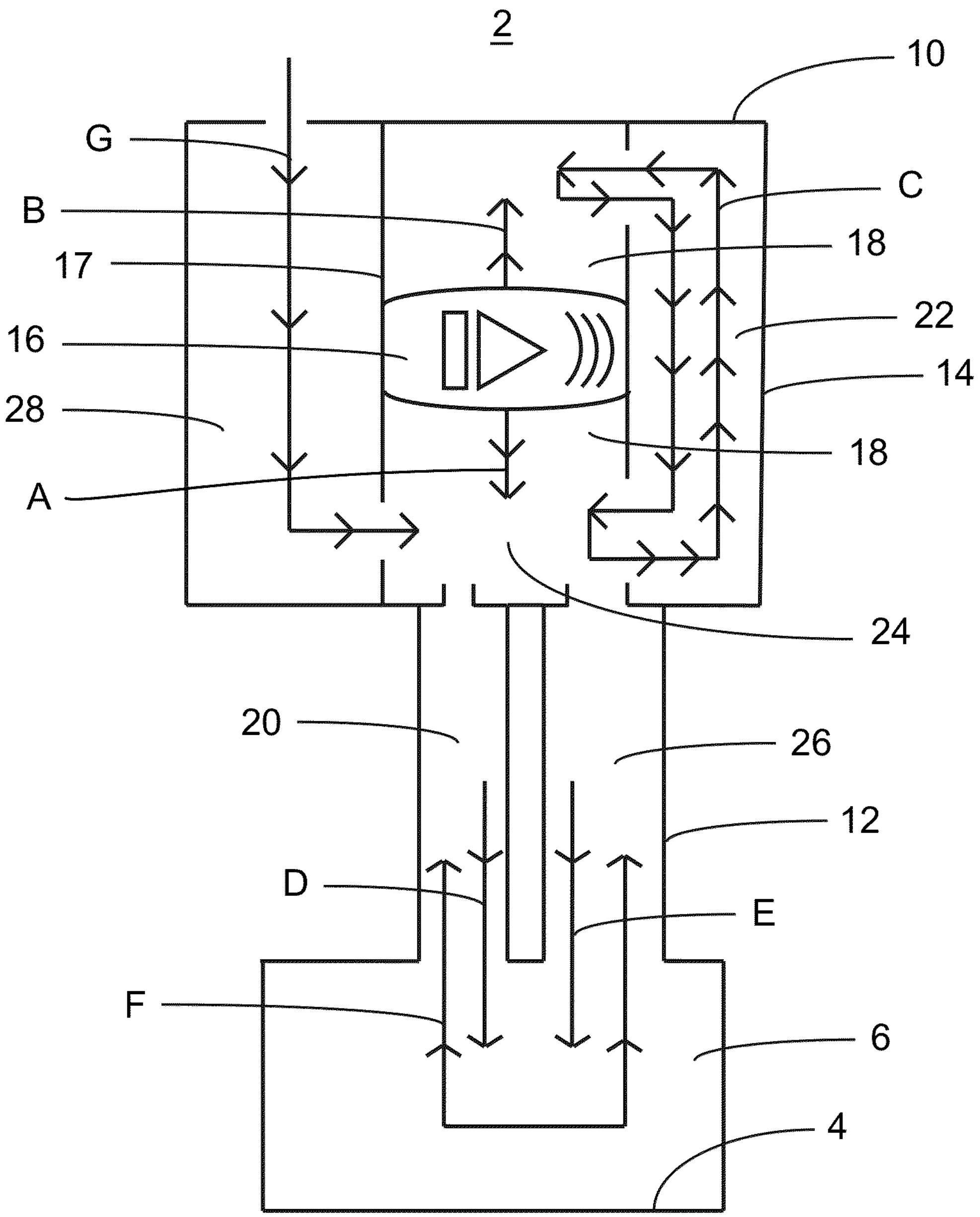
FIG. 1 is a schematic diagram of an embodiment of an earphone.
Figure 2:
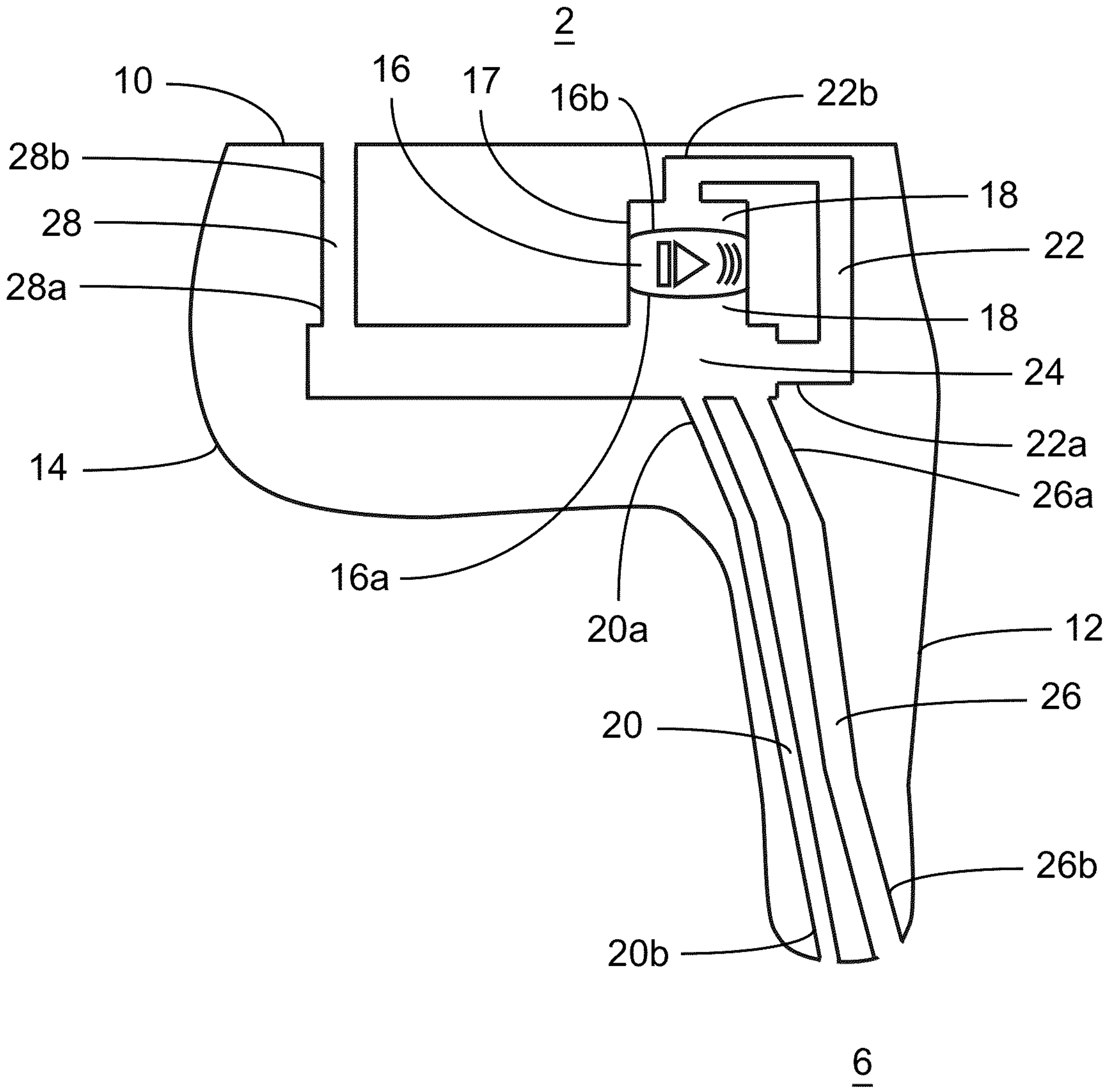
FIG. 2 is a side section view of an embodiment of an earphone according to FIG. 1.

Referring to FIGS. 1 and 2, an embodiment of an in-ear audio device or earphone 10 is shown, that is designed to be inserted in or partially in a user's ear canal, such as a hearing aid or other in-ear audio device. Earphone 10 has first and second portions or ends 12 and 14. End 12 is sized and shaped to be received in a user's ear canal, and positioned proximal to the user's eardrum 4. When inserted in the ear canal, end 12 defines an ear canal space or volume 6 between earphone 10 and eardrum 4.

When end 12 is positioned in the ear canal, end 14 is oriented or positioned away from the user, proximal to the environment 2 external to the user's ear canal. End 14 may be positioned in the ear canal (e.g., completely-in-the-canal CIC, or invisible-in-the-canal ITC hearing aids), or may be positioned in the concha at or partially in the ear canal (e.g., in-the-canal hearing aids). In a preferred embodiment, when end 12 is positioned in the ear canal, end 14 or at least a portion of the exterior surface of end 14 is exposed to the environment external to the user's ear canal.

Earphone 10 further comprises one or more acoustic transducers or speakers 16 (e.g., hearing aid receiver), and a channel 20 for transmitting sound from the speaker. Speaker 16 has a front side 16*a* that is designed to generate sound waves that reproduce an audio signal. When earphone end 12 is positioned in the ear canal, speaker front side 16*a* is positioned facing toward the user and eardrum 4, and speaker back side 16*b* is positioned facing away from the user and the eardrum. In one embodiment, speaker 16 is positioned in earphone end 14. In a preferred embodiment, earphone 10 has an internal speaker housing 17 with an inner space 18 that is sized and shaped to receive speaker 16. Speaker 16 is positioned or installed in housing interior space 17, such that speaker front and back sides 16*a* and 16*b* are not in direct fluid communication.

Sound channel 20 is in fluid communication with speaker 16 and ear canal space 6 for transmitting sound pressure from the speaker to eardrum 4. In the embodiment of FIG. 2, channel 20 is positioned in and preferably extends the length of earphone end 12, and has a first end 20*a* that is open to speaker front side 16*a*, and an opposite second end 20*b* that is open to ear canal space 6 (e.g., has an opening at the surface of earphone end 12).

In one embodiment, earphone 10 comprises a channel 22 that is in fluid communication with speaker front and rear sides 16*a* and 16*b*. Channel 22 is preferably positioned in earphone end 14, and is discrete or separate from speaker housing 17, with a first end 22*a* that is open to speaker front side 16*a*, and an opposite second end 22*b* that is open to speaker back side 16*b*. The push/pull movement of speaker 16 creates positive and negative air pressure from front and rear sides 16*a* and 16*b*, as shown by FIG. 1 (arrows A and B). Channel 22 allows both sides of speaker 16 to interact (arrow C), such that the push/pull movement of speaker 16 does not change the pneumatic pressure at the speaker front or back sides 16*a* and 16*b*.

Channel 22 functions as bidirectional pressure port that coordinates between the speaker front and back sides 16*a* and 16*b* to equilibrate and reduce pneumatic pressure in the ear canal without the need for a vent to the external environment or separate pressure management material. As the speaker moves the air mass the air pressure always has a place to go, and follows the path of least resistance which is the space from which the speaker has just previously occupied. The net pneumatic pressure on eardrum 4 is not increased and the impedance of the eardrum is not changed, which improves sound quality and reduces the potential for ear fatigue. Bidirectional pressure port 22 also minimizes vibration excursions on the tympanic membrane, that may induce the acoustic reflex. The impedance of the tympanic membrane is greater than the open air impedance of the speaker, and speaker wall cavities have minimal effect, such that there are no resulting excursions beyond those found in a normal open ear canal. In one embodiment, speaker front and back sides 16*a* and 16*b* are not in direct fluid communication, and are only in indirect fluid communication through bidirectional pressure port 22.

Bidirectional pressure port 22 advantageously reduces pressure in the ear canal without requiring earphone 10 to be vented to the environment external to the ear canal, or the use of additional materials to adjust the earphone impedance or manage pressure (e.g., elastic membrane or filter) as in conventional methods. Channel 22 may also be configured for earphone systems having multiple speaker drivers, to allow the speakers to move freely in both directions without impedance.

In addition to functioning as a bidirectional pressure port, channel 22 also operates as a bidirectional sound port that allows sound pressure from speaker back side 16*b* to be delivered to the ear canal space 6 and eardrum 4. Providing a passageway for sound from speaker back side 16*b* advantageously delivers a more robust signal to eardrum 4, such as by improving flat frequency response and extending dynamic range. For example, some musical stage designs have some of the speakers facing backwards to achieve a more full sound on stage and also a deeper presence for the audience. Backward facing speakers also create cross directional patterns and phasing of the sound source, which reduces the feeling that the sound is being presented by only right/left speakers. Capturing sound pressure from both the speaker front and back sides 16*a* and 16*b* is also found to produce a warmer sound by reducing speaker cabinet impedance.

Earphone 10 may include a cavity that forms a chamber for mixing or combining the sound pressure (and equilibration of pneumatic pressure) from the speaker front and back sides 16*a* and 16*b*, before delivery through sound channel 20 to ear channel space 6 and eardrum 4. In one embodiment, earphone 10 comprises an internal cavity 24 that is in fluid communication with speaker front side 16*a*. In a preferred embodiment, cavity 24 is positioned at speaker front side 16*a*, and opens to and is in direct fluid communication with the speaker front side. Channel first end 22*a* also opens to cavity 24, such that first end 22*a* is open to speaker front side 16*a* through the cavity, and speaker back side 16*b* is in indirect fluid communication with speaker front side 16*a* through the cavity (and bidirectional sound port 22). Thus, internal cavity 24 (in addition to channel 22) functions as a mixing chamber for sound pressure (and pneumatic pressure) from speaker front and back sides 16*a*. Sound channel end 20*a* also opens to cavity 24, such that sound channel 20 is in fluid communication with speaker 16 through the cavity, and delivers the combined sound pressure (and equilibrated pneumatic pressure) from speaker front and back sides 16*a* and 16*b* to eardrum 4, as shown by FIG. 1 (arrow D).

Earphone 10 may comprise multiple sound channels that deliver sound from the same chamber or cavity. These sound channels may have different configurations, such as different inner diameters, shapes and/or lengths. The use of multiple sound channels allows modification of the frequency response of the earphone—e.g., to smoothly frequency shape the sound and improve the sound signature compared to a single channel. In one embodiment, earphone 10 comprises a second sound channel 26 that is discrete or separate from sound channel 20. Sound channel 26 is similarly positioned in earphone first portion 12, and is in fluid communication with speaker 16 and ear canal space 6 for directing sound from the speaker to eardrum 4. In the embodiment of FIG. 2, channel 26 extends the length of earphone first portion 12, and has a first end 26*a* that is open to speaker front side 16*a*, and an opposite second end 26*b* that is open to ear canal space 6. In a preferred embodiment, sound channel end 26*a* opens to internal cavity 24, such that sound channel 26 is in fluid communication with speaker 16 through the cavity, and delivers the combined sound pressure (and equilibrated pneumatic pressure) from speaker front and back sides 16*a* and 16*b* to eardrum 4, as shown by FIG. 1 (arrow E).

The frequency response of earphone 10 may be shaped by adjusting the inner diameters, shapes and/or lengths of the two discrete sound channels 20 and 26. In one embodiment, sound channels 20 and 26 have different diameters. For example, the inner diameter of sound channel 26 may be selected to increase low frequencies or reduce high frequencies—e.g., to provide a flatter frequency response. The shape of the sound channels can be modified to produce a horn effect. The sound channels may also include a filter to adjust the sound profile of the sound channels, such as a musician grade filter, or other filter known in the art.

The use of multiple sound channels to tune earphone 10 provides several advantages over conventional methods. In typical earphone construction, it is common to save space and manifold numerous speakers into one sound pathway. Where dynamic speakers are used, having only one sound channel means the methods for adjusting sound signatures are restricted to either electronics (e.g., capacitors, resistors, circuitry, etc.), or plumbing effects such as narrowing, widening, or stepping such as a horn effect. These methods can introduce effects on phasing, and other unwanted effects such as echo and misplaced imaging. Compromises in sound quality may also be required. For example, increasing low frequencies normally requires reducing the high frequencies, which affects the clarity and perception of quality. In contrast, adding a second sound channel (e.g., smaller diameter) does not affect phasing or imaging, or introduce echo. A second sound channel also does not affect the sound from the first channel. For example, a second sound channel with increased low frequencies (high frequency pass) does not alter the original high \frequencies from the first sound channel. The brain still hears the highs from the first sound channel, and gets a boost of low frequencies from the second sound channel. In addition, multiple sound channels also function to equilibrate and reduce pneumatic pressure in the ear canal. The mass of air in ear canal space 6 can circulate between the two channels 20 and 26 (arrow F), and follows the path of least resistance to relieve pneumatic pressure on eardrum 4.

The insertion of earphone 10 in the user's ear canal preferably seals the ear canal. For example, earphone end 12 may be sized and shaped to be received in and seal the ear canal. Alternatively, earphone end 14 may seal the ear canal, or may assist in sealing the ear canal with end 12. In one embodiment, earphone 10 comprises a substantially sealed enclosure that is only vented to ear canal space 6 through the sound channel(s) in earphone end 12 (e.g., sound channels 20 and 26). Insertion of earphone 10 to seal the ear canal, substantially seals speaker 16 from fluid communication with the environment outside the ear canal, either directly or indirectly, and the earphone and ear canal comprise a fixed volume of air.

Alternatively, earphone 10 may be vented to the environment outside the ear canal to facilitate the user's ability to hear ambient sound external to the sealed ear canal. In one embodiment, earphone 10 comprises an ambient sound channel 28 that is open to the environment external to the ear canal for transmitting ambient sound (sound pressure). Ambient channel 28 is preferably positioned in earphone end 14, and has a first end 28*a* with an opening at the outer surface of earphone end 14 that is exposed to the external environment, and a second end 28*b* that is open to internal cavity 24. In one embodiment, channel 28 may be sized and shaped to receive a filter (not shown) that attenuates harmful noise or otherwise modifies the transmitted ambient sound profile. Suitable filters include musician grade filters, and other filters known in the art. In a preferred embodiment, ear canal space 6 is only in fluid communication with or vented to the external environment through channel 28.

As shown in FIG. 1, channel 28 combines the external ambient sound (arrow G) with the sound from speaker front and back sides 16*a* and 16*b* (arrows A, B, C) in mixing chamber 24, which is delivered through sound channel 20 (and 26) to ear channel space 6 and eardrum 4 (arrows D, E). This configuration minimizes the space required in comparison to conventional earphone designs where the ambient sound port is in direct fluid communication with ear canal 6 through a separate (parallel) channel running through earphone 10.

Earphone 10 may be made of various materials known in the art, including polymeric materials such as polytetrafluoroethylene (PTFE) and silicone. In a preferred embodiment, earphone 10 is made of stereolithography printed (SLA) acrylic resin. Channels 20, 22, 26 and/or 28 may be formed integrally in the body of earphone 10, or may be separately formed tubes made of silicone, polytetrafluoroethylene (PTFE), vinyl, or other materials known in the art.

Those of skill in the art will appreciate that earphone 10 may be provided in different sizes and configurations to fit different users or for different applications. In one embodiment, earphone 10 is designed to fit within the ear canal such that ear canal space 6 has a length (distance between the earphone and eardrum) of about 10 mm.

Where speaker 16 is a dynamic driver, speaker housing 17 is formed with an inner space 18 having at least a portion that is cylinder-shaped with an inner diameter of between about 4 mm to 12 mm, and preferably about 10 mm. Where speaker 16 is a balanced armature driver, housing inner space 18 has a cylindrical portion with an inner diameter of between about 1-14 mm. Bidirectional pressure port or channel 22 preferably has a volume of about 89 $mm^3$, and more preferably is a substantially cylindrical tube having a diameter of about 2.5 mm. Sound mixing chamber or cavity 24 preferably has a volume of about 0.007 cubic inches (119 $mm^3$). Sound channel 20 is preferably configured to have a resonant frequency of about 305 Hz. In one embodiment, sound channel 20 is a substantially cylindrical tube having an inner diameter between about 0.010 inches to 0.080 inches, and preferably about 0.033 inches, with a length of about 0.894 mm. Sound channel 26 is preferably configured to have a resonant frequency of about 836 Hz. In one embodiment, sound channel 26 is a substantially cylindrical tube having an inner diameter between about 0.050 inches to 0.120 inches, and preferably about 0.084 inches, with a similar length as sound channel 20.

Figure 3:
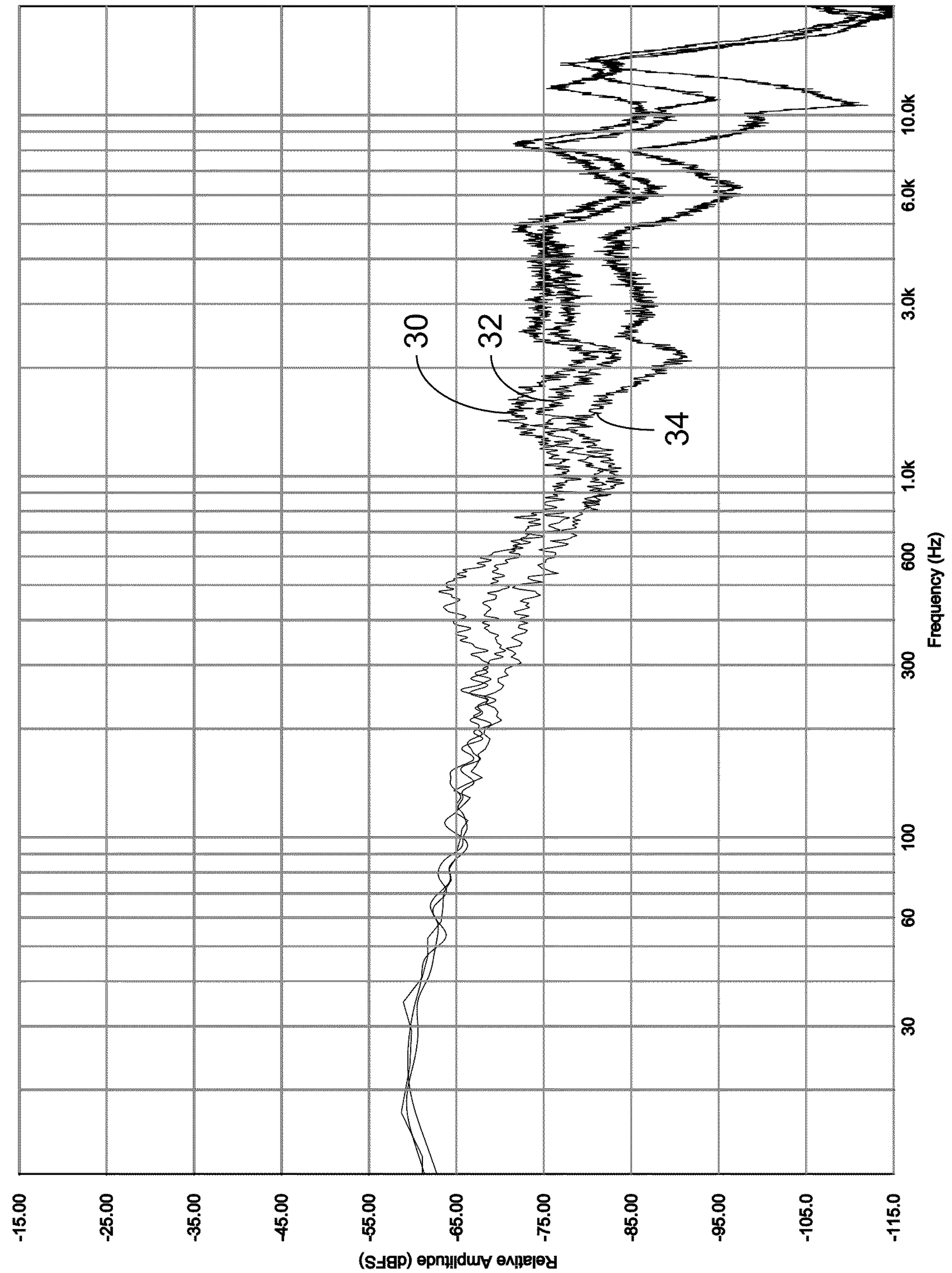
FIG. 3 is a logarithmic plot of sound amplitude (dBFS) vs. frequency (Hz) for an earphone having two sound channels of different diameter and same length, where both sound channels are open, or either sound channel is closed.

FIG. 3 shows the frequency response of an earphone having two sound channels with different diameters and the same length—a small channel with a diameter of 0.033 inches, and a large channel tapering from a diameter of 0.74 inches to 0.084 inches at the bore. The frequency response was measured using an occluded ear simulator (PCB Piezotronics Model AEC304), as is known in the art. Line 30 corresponds to the earphone with both sound channels open. Line 32 corresponds to the same earphone with the small channel open and the large channel closed, and line 34 corresponds to the earphone with the small channel closed and the large channel open. The two open sound channels are found to interact in the mid/high frequency ranges, but have marginal effect on lower frequencies. The resulting frequency response exhibits smoothing of peaks, increased amplitude above 10 KHz, generally flatter frequency response, and wider dynamic range in comparison to a single sound channel.

Figure 4:
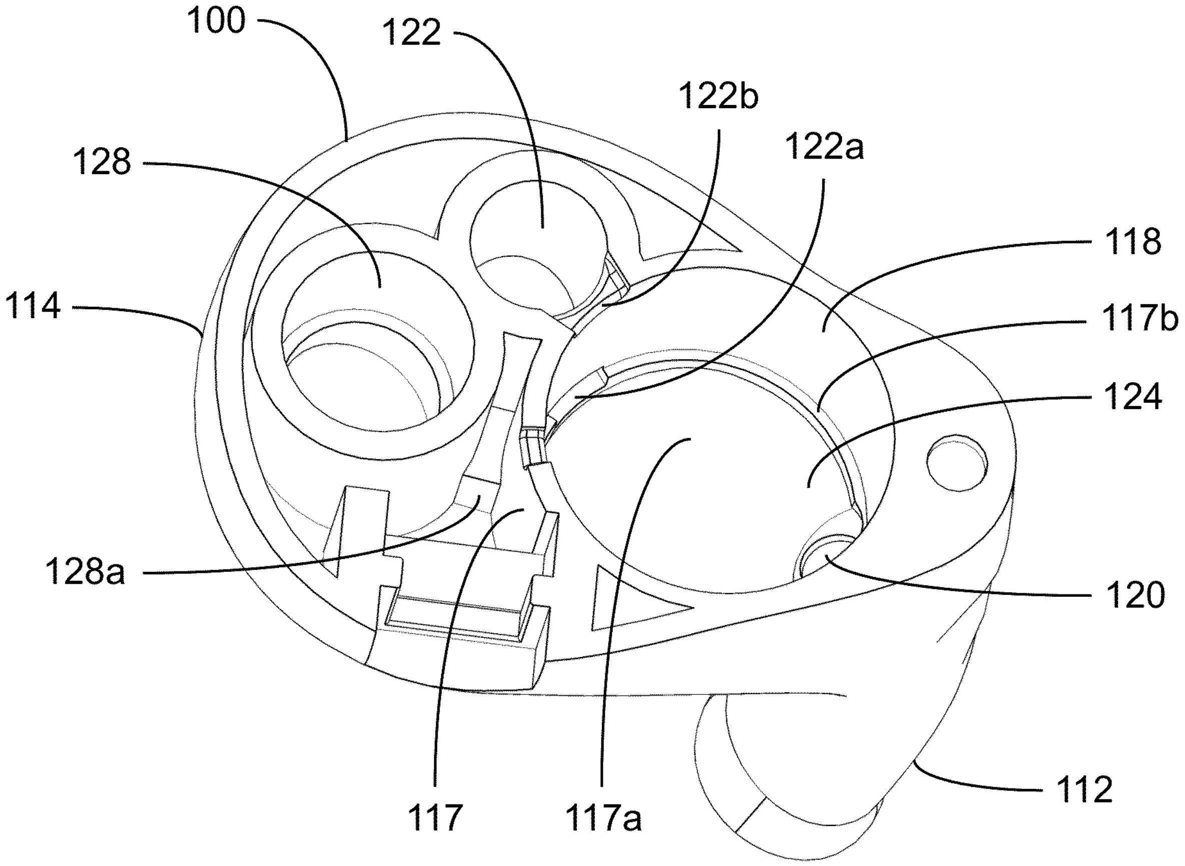
FIG. 4 is a top section orthographic view of an embodiment of an earphone.

FIG. 4 shows an alternative embodiment of an earphone 100 having a similar structure to earphone 10. Earphone 100 comprises first and second portions or ends 112 and 114. End 112 is sized and shaped to be received in a user's ear canal. End 114 is oriented away from the user and is positioned in the concha at or partially in the ear canal. A portion of the outer surface of end 114 (not shown in the section view) is exposed to the environment external to the user's ear canal.

A housing 117 is positioned in end 114 and has an inner space 117*a* that is sized and shaped to receive a speaker (not shown). Housing inner space 117*a* has a first portion or end 118 distal to earphone end 112, and a second portion or end 124 proximal to end 112. Housing first end 118 is sized and shaped to receive the speaker, such that the speaker front and back sides are not in direct fluid communication within housing first end 118. In one embodiment, housing 117 is a cylindrical tube, with the portion of inner space 117*a* at first end 118 having an inner diameter that is about the same diameter as a round speaker. The installation or mounting of the speaker in housing first end 118 generally seals the front and back sides of the speaker from direct fluid communication within housing first end 118. The speaker may be secured in housing first end 118 by friction fit and/or a silicone sealant or other sealant known in the art.

The speaker is positioned in housing first end 118 with the front side of the speaker oriented or positioned toward second end 124, which forms a sound mixing chamber similar to cavity 24. In one embodiment, housing 117 has a flange 117*b* that projects into interior space 117*a*, and separates housing ends 118 and 124. Flange 117*b* operates as a stop that prevents the speaker from being inserted into housing inner space 117*a* past first end 118 and into second end 124, and ensures that end 124 will be maintained as a sound mixing cavity. In a preferred embodiment, flange 117*b* comprises a rim or shelf that substantially encircles housing inner space 117*a*, and has a smaller inner diameter than first end 118.

A sound channel 120 is positioned in housing end 112, and is in fluid communication with the speaker and ear canal similarly to sound channel 20. Sound channel 120 opens to housing inner space 117*a* at sound mixing end 124, extends through earphone end 112, and is open to the ear canal and ear drum.

A bidirectional pressure channel 122 is in fluid communication with the front and rear sides of the speaker, similarly to channel 22. Channel 122 has a first end 122*a* that opens to housing end 124 at the front side of the speaker, and a second end 122*b* that opens to housing end 118 at the back side of the speaker. Channel 122 allows indirect fluid communication between the front and back sides of the speaker to equilibrate and reduce pneumatic pressure in the ear canal.

Earphone 100 may include an ambient channel 128 that is vented to the environment outside the ear canal, similarly to ambient channel 28. Ambient channel 128 has a first end 128*a* that is open to sound chamber end 124, and a second end (not shown in section view) that is open to the external environment at earphone end 114. In one embodiment, channel 128 is sized and shaped to receive a filter for modifying the transmitted ambient sound profile, such as a musician grade filter or other filter known in the art. In a preferred embodiment, the ear canal is only in fluid communication with or vented to the external environment through channel 128 and sound chamber end 124.

While the disclosure has been described in terms of exemplary embodiments, those skilled in the art will recognize that the disclosure can be practiced with modifications in the spirit and scope of the instant disclosure. These examples given above are merely illustrative and are not meant to be an exhaustive list of all possible designs, embodiments, applications or modifications of the disclosure.

What is claimed is:

1. An in-ear audio device, comprising:

first and second device ends, the first device end sized and shaped to be received in the ear canal of a user;

a speaker having front and back sides that produce sound pressure, and that are not in direct fluid communication;

a primary sound channel comprising a tube with an inner diameter, and having first and second primary sound channel ends, the first primary sound channel end in fluid communication with the speaker, and the second primary sound channel end having an opening at the first device end; and a secondary sound channel comprising a tube with an inner diameter, and having first and second secondary sound channel ends, the first secondary sound channel end in fluid communication with the speaker, and the second secondary sound channel end having an opening at the first device end; and an internal cavity in fluid communication with the speaker front side, the first primary sound channel end having an opening to the internal cavity, and the first secondary sound channel end having an opening to the internal cavity, wherein the first primary sound channel end and first secondary sound channel end are in fluid communication with the speaker through the internal cavity;

a bidirectional pressure channel having first and second pressure channel ends, the first pressure channel end having an opening to the speaker back side, and the second pressure channel end having an opening to the internal cavity;

wherein the speaker front and back sides are in indirect fluid communication through the pressure channel and internal cavity, and the sound pressure from the speaker front and back sides is combined in the internal cavity and delivered to the user's ear canal through the primary and secondary sound channels; and wherein the primary and secondary sound channels have different configurations selected from the group consisting of: different inner diameters, lengths, shapes, and combinations thereof.

2. The in-ear audio device of claim 1, wherein the primary and secondary sound channels have different inner diameters, the primary sound channel having an inner diameter between about 0.010 inches to 0.080 inches, and the secondary sound channel having an inner diameter between about 0.050 inches to 0.120 inches.

3. The in-ear audio device of claim 1, wherein the primary sound channel has an inner diameter of about 0.033 inches, the secondary sound channel has an inner diameter of about 0.084 inches, and the primary and secondary sound channels each have a length of about 0.894.

4. The in-ear audio device of claim 1, wherein the environment external to the ear canal has an ambient sound pressure and an ambient sound profile, the device further comprising:

an ambient channel having first and second ambient channel ends, the first ambient channel end having an opening to the internal cavity, and the second ambient channel end having an opening at the device second end that is exposed to the environment external to the ear canal;

wherein the ear canal is only in fluid communication with the external environment through the ambient channel, and the ambient sound pressure and sound pressure from the speaker are combined in the internal cavity and delivered to the user's ear canal through the primary and secondary sound channels.

5. The audio device of claim 4, wherein the ambient channel is sized and shaped to receive a filter that modifies the ambient sound profile.

6. The in-ear audio device of claim 1, wherein at least one of the primary and secondary sound channels is shaped to produce a horn effect.

7. An in-ear audio device, comprising:

first and second device ends, the first device end sized and shaped to be received in the ear canal of a user, and the second device end is exposed to the environment external to the ear canal when the first portion is positioned in the ear canal;

a speaker having front and back sides that produce sound pressure, wherein the front and back sides are not in direct fluid communication;

an internal cavity in fluid communication with the speaker front side;

a bidirectional pressure channel having first and second pressure channel ends, the first pressure channel end having an opening to the speaker back side, and the second pressure channel end having an opening to the internal cavity;

a primary sound channel comprising a tube with an inner diameter, and having first and second primary sound channel ends, the first primary sound channel end having an opening to the internal cavity, and the second primary sound channel end having an opening at the first device end;

a secondary sound channel comprising a tube with an inner diameter, and having first and second secondary sound channel ends, the first secondary sound channel end having an opening to the internal cavity, and the second secondary sound channel end having an opening at the first device end; and an ambient channel having first and second ambient channel ends, the first ambient channel end having an opening to the internal cavity, and the second ambient channel end having an opening at the device second end that is exposed to the environment external to the ear canal;

wherein the ear canal is only in fluid communication with the external environment through the ambient channel, and the ambient sound pressure and sound pressure from the front and back sides of the speaker are combined in the internal cavity and delivered to the user's ear canal through the primary and secondary sound channels; and wherein the primary and secondary sound channels have different resonant frequencies.

8. The in-ear audio device of claim 7, wherein the primary and secondary sound channels have different inner diameters.

9. The in-ear audio device of claim 8, wherein the primary sound channel has an inner diameter between about 0.010 inches to 0.080 inches, and the secondary sound channel has an inner diameter between about 0.050 inches to 0.120 inches.

10. The in-ear audio device of claim 7, wherein the primary sound channel has an inner diameter of about 0.033 inches, the secondary sound channel has an inner diameter of about 0.084 inches, and the primary and secondary sound channels each have a length of about 0.894.

11. The in-ear audio device of claim 7, wherein the primary sound channel has a resonant frequency of about 305 Hz, and the secondary sound channel has a resonant frequency of about 836 Hz.

12. The in-ear audio device of claim 7, wherein the frequency response of at least one of the primary and secondary sound channels is modified by a filter.

* * * * *